July 5, 1960 W. D. HOUGHTON 2,944,108

TELEVISION SYNCHRONIZING SYSTEM

Filed March 27, 1958

INVENTOR.
WILLIAM D. HOUGHTON
BY
W. H. Sprague
ATTORNEY

United States Patent Office 2,944,108

Patented July 5, 1960

2,944,108

TELEVISION SYNCHRONIZING SYSTEM

William D. Houghton, Princeton, N.J., assignor to Radio Corporation of America, a corporation of Delaware Filed Mar. 27, 1958, Ser. No. 724,458

7 Claims. (Cl. 178—6.6)

This invention relates to a system for providing automatic synchronization of television signals derived from a movable storage medium.

More particularly, the invention deals with a synchronizing arrangement for a television transmission system in which it is desired to interchangeably transmit either a television signal derived from a magnetic tape or a locally generated television signal in such a manner as to obviate any discontinuity in the series of signal transmissions which may occur during the transition from one signal source to the other.

In conventional practice, television transmitting stations transmit a composite television signal, which signal mainly comprises a video component, a synchronizing component, and a blanking component. Generally, the synchronizing (sync) and blanking components are generated by a sync signal generating system preferably located at a position near the point of image pickup. The synchronizing and blanking information is supplied to the image pickup equipment for synchronization of its scanning action in the production of the video signal. The synchronizing and blanking information is then combined with the resulting video signal to produce the composite signal for modulation of the television transmitter.

When it is desired to transmit or retransmit program material previously recorded on a magnetic tape, for example, it becomes desirable to supply some means for locking or timing the local sync generator signals with the signal recovered from the magnetic tape. This time-locked feature generally is necessary because the signal recorded on tape may have been generated originally on a different frequency standard from that of the locally generated signal. Further, the difficulty of driving the tape system at the particular speed required to maintain synchronism between synchronizing signals recovered from the tape and the locally generated synchronizing signals is very great. If no time-locking feature were provided, switching between a locally generated program material source and a recovered program material source would likely result in a disturbance in the reproduced television image at television receivers due to discontinuity in synchronizing information applied to the television receiver beam deflection system.

Moreover, in the transmission of special effects such as "lap dissolves," video "wipes," or composite pictures produced by the superimposition of the recovered tape signal and the locally generated signal, it is necessary to maintain precise synchronization and accurate phasing between the two signals undergoing the special effects process. For example, it is well known that failure to maintain proper lock-in between the two superimposed television signals will create the effect of one picture drifting past the other.

As a solution to such a problem, one possible arrangement is to use the recovered tape sync signals as the standard. The sync signals for the locally derived image signals are then tied to or "genlocked" to the recovered tape sync signals, but due to "tape dropout" (resulting from imperfections in the magnetized tape coating) and other irregularities which may occur in the tape signals, the use of such tape derived signals is not presently desirable for most purposes.

In the past, sync signals recovered from the tape have been compared with a standard sync signal derived from a local source to obtain an error control voltage to vary the tape capstan drive speed. Thus, in reproduction, the video signals from the tape are phase-locked to the horizontal pulses from a local sync generator by means of a servo controlled tape drive system. This unit operates to maintain a fixed time relation between the reproduced tape horizontal sync pulses and the local sync generator horizontal pulses. This is accomplished by phase comparing the two pulse trains in a pulse phase comparator network. The error signal output from the phase comparator is then used to control the tape velocity so as to maintain the required registry between the horizontal sync signals. When the reproduced horizontal sync signal is thus locked to the sync generator horizontal output, the reproduced video signals are also phase-locked to the local sync generator pulses.

However, with the above arrangement, only the horizontal lock is made automatically and vertical framing is accomplished by manually opening the servo loop and allowing the tape speed to change until vertical registry is obtained. When vertical registry is obtained, the loop is again closed and vertical registry is maintained as long as the horizontal sync pulses are uninterrupted. Since the time required to effect this framing is dependent upon the ability of the operator, exact timing of the reproduced program material becomes very difficult to achieve. Further, once synchronism is lost, the above manual framing procedure, which is a relatively slow one, must be again repeated.

It is, therefore, an object of this invention to provide a simple means for time positioning the television signals recovered from a movable storage medium relative to standard television signals.

Another object of the invention is to provide an automatic vertical synchronizing signal locking arrangement having a known time of operation for use in a television tape recording system.

A further object of this invention is to provide an improved system for first establishing vertical framing of reproduced magnetic tape recorded television signals followed by horizontal framing thereof with respect to locally generated signals with provision for recycling the complete operation in case of interruption of either set of signals.

Still another object of the present invention is to provide a system for synchronizing television signals recovered from a magnetic recording medium with those derived from a locally generated television signal in conjunction with special effects apparatus so as to improve the reproduced relationship between image components represented by the two television signals.

Another object of the present invention is to provide an improved television control system for controlling a magnetic tape reproducing system in accordance with synchronizing information derived from an unrelated locally generated composite television signal, said television control system being fully automatic in operation to secure precise interlace coincidence between the local and tape signals so as to obviate discontinuities in signal transmission when alternately switching from the local television signal to the reproduced television signal.

In accordance with the invention, a composite television signal recorded on a movable storage medium, such as a magnetic tape, is recovered from the tape. The vertical and horizontal synchronizing signals are separated from the recovered composite television signal. The recovered vertical sync signals are then compared to the vertical sync signals derived from a local standard synchronizing signal generator to provide an error signal indicative of any mismatch therebetween. As long as this error signal is above a predetermined level, the tape velocity is varied until registry between the local and recovered vertical sync signals is obtained. Next, the tape speed is varied by an error signal derived from the comparison of the recovered horizontal sync signals with the standard locally generated horizontal sync signals.

Thus, during reproduction, the horizontal locking unit is made inoperative until registry is obtained between the standard vertical sync signal and the recovered vertical sync signal. When such registry is obtained, the horizontal speed control information is automatically applied to the tape drive system and horizontal lockin is thereby established. This horizontal locking unit maintains horizontal as well as vertical framing as long as the signals are uninterrupted.

In one form of the invention, the error signal employed to obtain registry between the two trains of vertical sync signals is a predetermined cyclical control signal which varies the tape speed in a predetermined manner until the phase difference between the recovered vertical sync and the standard vertical sync is reduced below a predetermined value at which time horizontal sync locking control is made operative.

In another form of the invention, the error signal employed to obtain vertical sync registry may be that obtained by a phase comparison of the vertical sync signals.

In either form of the invention, once the horizontal sync signal registry is lost and the vertical sync signals become mismatched beyond a predetermined amount, the automatic vertical framing control system assumes control until registry is again obtained between the standard vertical sync signal and the recovered vertical sync signal. The tape speed control is then returned to the horizontal sync signal locking unit.

The novel features of this invention as well as the invention itself, both as to its organization and method of operation, will best be understood from the following description, when read in connection with the accompanying drawings, in which like reference numerals refer to like parts, in which.

The invention will be explained with reference to those parts of a conventional tape recording system which involve the tape drive mechanism and the recovery of signals from the tape such as television signals. For the sake of clarity of illustration, the ground symbols have been omitted from the block diagrams illustrated in the several figures. However, these symbols may be assumed as being present wherever necessary to complete a circuit path for current flow.

Figure 1:
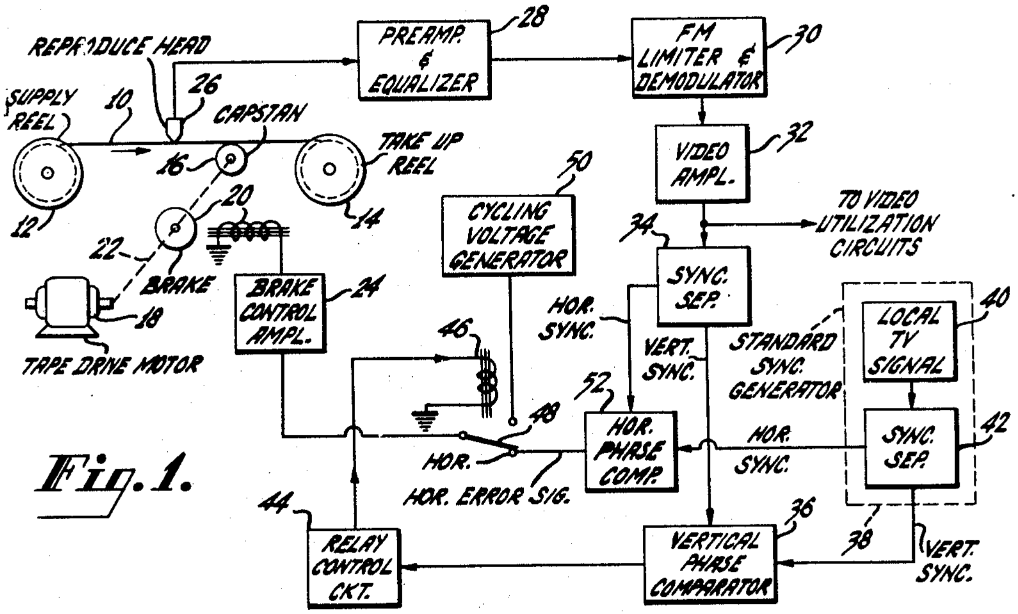
Figure 1 is a partial block and partial perspective diagram of a framing system in accordance with the invention.

Referring to Figure 1, a movable storage medium 10, for example a magnetic tape, is moved in the direction indicated by the arrow between a supply reel 12 and a take-up reel 14. The speed by which the magnetic tape 10 is driven is controlled by a capstan 16 which is driven at a predetermined speed by a tape drive motor 18. The predetermined speed of the motor 18 is slightly in excess of that which occurred during the previous recording of signals on the tape 10. The motor 18 is operated at this higher speed so as to allow speed control by an eddy current brake 20. The eddy current brake 20 operates upon the motor drive shaft 22 to slow its speed, and thus the speed of the capstan drive 16, to that desired depending upon the control current applied to the eddy current brake 20 by a brake control amplifier 24.

The tape 10 is illustrated as having a transducer 26 placed in close proximity thereto so as to convert magnetic variations recorded on the tape into corresponding electrical variations. It is assumed that the tape 10 contains a record of a composite television signal including synchronizing signals recorded in one or more tracks thereon. The transducer or pickup head 26 converts the magnetically recorded composite television signal into corresponding electrical variations. It is further assumed that the recorded composite television signal is frequency modulated on a suitable carrier as is well known in the tape recording art. Thus, the recovered composite frequency modulated signal is coupled through a conventional preamplifier and response equalizer 28 which amplifies the signal and corrects for the usual tape distortions imparted thereto. The amplified signal from the preamplifier 28 is coupled to a conventional FM limiter and demodulator 30 from which the composite television signal is derived. While the recorded television signal has been illustrated as recorded as a frequency modulated carrier it is understood by those skilled in the art that the entire television signal or portions of the signal may be directly recorded on one or more tracks on the tape 10. A typical system for directly recording a television signal directly on a magnetic tape is described, for example, in U.S. Patent No. 2,734,941 issued February 14, 1956 to J. A. Zenel. A suitable system wherein a television signal is separated into several portions and directly recorded on a magnetic tape is described in an article appearing on page 10 of the "RCA Review" of March 1954. The derived composite television signal is amplified by a conventional video amplifier 32 and passed to suitable utilization circuits which may, for example, include a television transmitter and/or typical studio monitoring circuits.

The composite television signal derived from the amplifier 32 is also coupled to a synchronizing signal separator 34 which may be of the type commonly found in commercially available television receivers. A treatment of the general subject may be found in "Basic Television Principles and Servicing" by H. Grob (first edition 1949—McGraw Hill) beginning on page 362. The sync separator 34 provides separated horizontal synchronizing signals and vertical synchronizing signals which are the recovered sync signals from the tape 10. The recovered and separated vertical sync signals derived from the sync separator 34 are compared in a vertical synchronizing signal phase comparator 36 with highly stable standard synchronizing signals from a synchronizing signal generator 38. The sync generator 38 may be a conventional studio sync generator such as the TG–2A studio sync generator, manufactured by Radio Corporation of America Engineering Products Department, Camden 2, New Jersey which is described in detail by Instruction Bulletin IB–36155–1. In the alternative, the sync generator 38 may comprise a source 40 of a local or distant television signal which is passed through a sync separator 42 from which horizontal and vertical sync signals are available.

Figure 2:
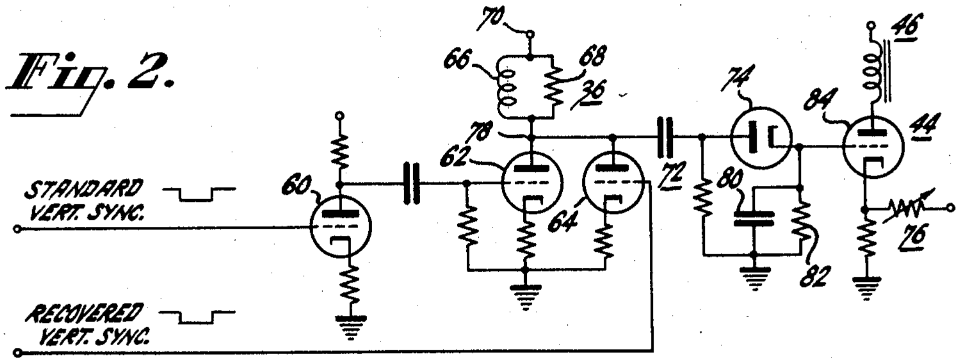
Figure 2 is a vertical sync signal phase comparator and relay control circuit which may be employed in the system of Figure 1.

In response to any phase deviation of the recovered vertical sync signals relative to the standard sync signals from the sync generator 38, the vertical sync signal phase comparator 36 produces an error voltage which is applied through a relay control circuit 44 to the winding of a relay 46 having an armature 48. Suitable circuitry for the vertical phase comparator 36 and the relay control circuit 44 are illustrated in Figure 2 which will later be described. The function of the relay control circuit 44 is to detect when the error signal generated by the vertical phase comparator 36 is reduced below a predetermined minimum value. The armature 48, when operated by energization of the winding of the relay 46, couples a cycling voltage signal from a cycling voltage generator 50 to the brake control amplifier 24. When deactivated, the armature 48 couples a horizontal error signal from a horizontal phase comparator 52 to the brake control amplifier 24.

As long as the error signal from the vertical sync signal phase comparator 36 is above a predetermined value, the relay control circuit 44 maintains the relay 46 in an energized condition, thus coupling the cycling voltage to the brake control amplifier. The cycling voltage from the cycling voltage generator 50 may be a suitable varying voltage capable of varying the tape speed through the eddy current brake 20 in a predetermined manner such that the recovered vertical sync signals are varied in time position ahead of and behind the standard vertical sync signals obtained from the standard sync generator 38. As the tape speed is varied under control of the cycling voltage generator 50, a condition is reached wherein the vertical sync signals from the tape signal substantially coincide with the vertical sync signals from the sync generator. When this condition is detected by the vertical phase comparator 36 and the relay control circuit 44, the relay 46 is de-energized, and the horizontal error signal derived from the horizontal phase comparator 52, is applied to the eddy current brake 20 for speed control of the tape 10 by the horizontal sync signals.

The horizontal phase comparator 52 compares the recovered horizontal sync signals from the tape 10 with the horizontal sync signals derived from the standard sync generator 38. In response to any phase deviation of the recovered sync signals from the standard sync signals, the horizontal phase comparator 52 produces an error voltage which is applied through the brake control amplifier 24 to the eddy current brake 20, thereby controlling the speed of the tape 10. Phase comparators, such as the horizontal phase comparator 52, are well known to those skilled in the television, communication, and allied arts. The automatic frequency control circuits of many receivers employ phase comparators extensively. Automatic frequency control circuits such as "genlock," "synchroguide," and "synchrolock" are described in the aforementioned book by Grob, page 337 etc., and also in the RCA sync generator instruction book. Thus, if the velocity of the tape 10 varies such that the horizontal sync signals recovered therefrom vary from the horizontal sync signals of the local sync generator 38, the error voltage works through the eddy current brake 20 so as to change the speed of the tape drive motor 18 and thus, the speed of the tape 10, such that coincidence between the horizontal sync signals is maintained.

It will be appreciated by those skilled in the art, that instead of the magnetic, or so-called eddy current brake illustrated, the error signals derived from the phase comparator 52 and the cycling voltage derived from the generator 50 may be applied through a reactance tube controlled oscillator to directly vary the speed of the tape drive motor 18. One such system is described, for example, in U.S. Patent No. 2,797,263 issued to Ray M. Dolby, entitled "System and Method for Recording and Reproducing Records," dated June 25, 1957.

In Figure 2, the details of the vertical sync signal phase comparator 36 and relay control circuit 44 are illustrated. The function of the circuit of Figure 2 is to detect the absolute magnitude of any phase difference between the vertical sync signals derived from the standard sync generator 38 (Fig. 1) and the vertical sync signals recovered from the tap 10 (Fig. 1). As long as this phase difference exceeds a predetermined value, the circuit energizes the relay 46 (Fig. 1). Otherwise, the relay 46 (Fig. 1) is de-energized and thus allows the tape speed to be controlled by the horizontal error signal derived from horizontal phase comparator 52 (Fig. 1). However, during the time interval when the vertical sync signals are out of phase by a predetermined amount, the tape speed is controlled by the cycling voltage generator 50 (Figure 1). The cycling voltage generator provides a cycling control signal which enables the vertical sync pulses to rapidly achieve phase coincidence. Thus, assuming that the vertical sync signals are negative going, the vertical sync signal derived from the sync generator 38 (Fig. 1) is coupled through a phase inverter 60 to an amplifier 62. In like manner, the vertical sync signals recovered from the tape are coupled to an amplifier 64. The anodes of each of the amplifiers 62 and 64 is coupled through an inductance coil 66, properly damped by a resistor 68, to a source of B+ potential 70. The value of the inductance 66 is so chosen in conjunction with the value of the damping resistor 68, that, when pulse actuated, the circuit provides a one cycle rings as illustrated by the comparator output waveforms (*b*) and (*c*) of Figure 3. The anodes of the amplifiers 62 and 64 are also coupled through a differentiating circuit 72 and a diode 74 to the input of a threshhold amplifier 84. The winding of the relay 46 is coupled in the anode circuit of the amplifier 84. The potential of the cathode circuit of the threshold amplifier 84 is varied with a variable bias means 76.

Figure 3:
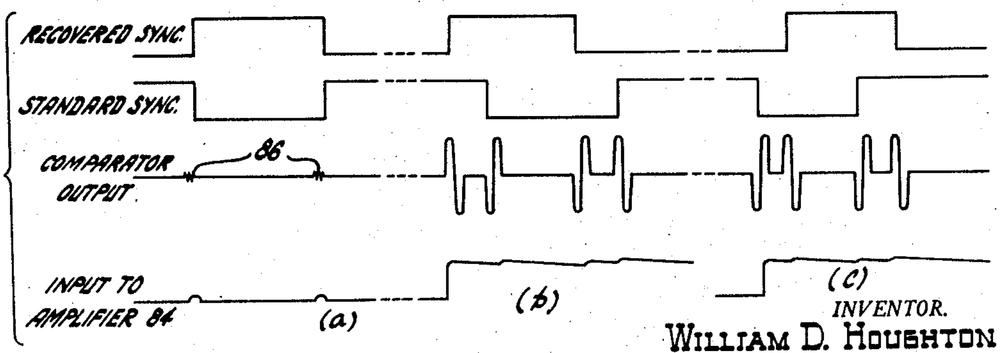
Figure 3 is a series of graphs illustrating the waveforms which occur in the circuit of Figure 2.

The operation of this circuit of Figure 2 will now be described with reference to Figure 3 wherein the upper waveforms illustrate the vertical sync signals appearing at the outputs of the amplifiers 62 and 64. The middle waveforms illustrate the comparator output at the common point 78. This output represents the combined effects of the currents controlled by each amplifier 62, 64 flowing through the common inductor 66 and resistor 68. The lower waveforms illustrate the input to the threshold amplifier 84. The waveform (*a*) is produced when the vertical sync signals from the two sources are of equal polarity and are in time coincidence. In this instance, no output of the common point 78 is produced since the sync signals cancel each other, except for a slight disturbance 86 which might occur at the beginning and termination of the sync signals.

The waveform (*b*) is produced when the sync signal recovered from the tape precedes the standard sync signal. In the waveform (*b*), the comparator output at point 78 appears as a series of single cycle oscillations, each being triggered by the leading and trailing edges respectively of the vertical sync signals. The positive going portions of each of these single cycle oscillations are differentiated by the differentiating circuit 72, rectified by the diode 74, and the resulting direct current voltage is applied to the input of the threshold amplifier 84 as illustrated by the lower waveform of Figure 3. The positive going portions of the voltage pulses of waveform (*b*) charge the capacitor 80 through the low impedance of the diode 74. The capacitor 80 maintains this charge for a time interval determined by the value of the resistor 82 to grid bias the threshold amplifier 84 into a conducting (i.e. "on") condition. The threshold amplifier 84 remains biased in an "on" condition until the sync signals substantially coincide and operate to cancel each other such that the comparator output is reduced to essentially zero as illustrated in the first waveform (*a*). The particular point at which the threshold amplifier ceases conduction is determined by the adjustment of the cathode bias control resistor 76. The waveform (*c*) is produced when the locally generated sync signal precedes in time the sync signal recovered from the tape.

Note that the circuit of Figure 2 is one of many that may be employed with the invention and any other suitable comparator may be employed as desired.

In another form of the invention, the vertical phase comparator 36 may include a field identification unit of the type described in U.S. Patent No. 2,570,775, entitled "Electrical Timing Comparator Circuit," issued October 9, 1951, to J. R. DeBaun. The DeBaun patent describes apparatus for distinguishing between what has been designated as even line and odd line fields. For example, the line synchronizing pulses in a standard television signal and at a point in the signal corresponding to the bottom of the image or picture, there is provided a series of six equalizing pulses each separated by an interval equivalent to one-half a horizontal line period. This configuration is arbitrarily assumed to represent the first portion of an even line field scansion representation in as much as the last horizontal line synchronizing pulse is separated from the first equalizing pulse by a full horizontal line interval. Conversely, the odd line fields have been designated as those wherein the last line synchronizing pulse is separated from the first equalizing pulse by only a half line interval.

Thus, if two unrelated composite television signals (one from tape and one from a local source) are to be interchangeably transmitted with absolutely no discontinuity occurring during the switching operation, the two signals have to be in interlace coincidence, i.e. synchronized on a frame, line and field basis. Stated in another manner, even line field video signals generated locally are not continuously interchangeable, and thus capable of smooth mixing, with odd line field video signals recovered from tape. Instead, the even line field video signals derived from the local source must coincide with the tape recorded even line field video signals. The field detecting circuit of the DeBaun reference describes a field distinguishing arrangement which provides a 30 cycle per second signal representative of the even line field pulses in a composite television signal. By thus coupling even line field pulses derived respectively from the standard sync signals and the recovered sync signals to the vertical phase comparator 36 (Fig. 1), precise interlace coincidence between the recovered and locally generated television signals may be obtained.

There has thus been described a very simple arrangement for automatically obtaining synchronization between the vertical synchronizing signals obtained from a magnetic tape recorded television signal and a locally generated television signal. Once vertical registry is obtained, control of the tape speed is then switched to a line-by-line comparison between the horizontal sync signals. If the horizontal sync signals are lost at any time, the arrangement provides an automatic means for returning control to the vertical sync signals until registry between the vertical signals is again obtained. Also, exact interlace coincidence is achieved between the video signals derived from the two sources so that switching from one source to the other may be effected without producing any undesired signal transmission discontinuities.

What is claimed is:

1. In a television system having a composite television signal recorded on a movable storage medium, said television signal including a picture representative component, and line and field synchronizing components, the combination of means for recovering said composite television signal from said storage medium, means for separating the line and field synchronizing components from the recovered composite television signal, a source of standard line and field synchronizing components for a local television signal, means for comparing the phase of said separated field synchronizing components with the phase of said standard field synchronizing components, and means for varying the movement of said storage medium in a predetermined manner until the phase of said recovered field synchronizing components and the phase of said standard field synchronizing components substantially coincide.

2. In a television system having a composite television signal recorded on a movable storage medium, said television signal including a picture representative component, and line and field synchronizing components, the combination of means for recovering said composite television signal from said storage medium, means for separating the line and field synchronizing components from the recovered television signal, a local source of line and field synchronizing components for a local television signal, means for comparing the phase of said separated field synchronizing components with the phase of said local field synchronizing components, and means for varying the speed of movement of said storage medium in a predetermined cyclical manner until the timing relation between said recovered field synchronizing components and said generated field synchronizing components coincide.

3. In a television system having a composite television signal recorded on a movable storage medium, said composite television signal including a picture representative component, and line and field synchronizing components, the combination of means for recovering said composite television signal from said storage medium, means for separating the line and field synchronizing components from the recovered television signal and from one another, a source of standard line and field synchronizing components for a local television signal, means for comparing the phase of said separated field synchronizing components with the phase of said standard field synchronizing components, means for comparing the phase of said separated line synchronizing components with the phase of said standard line synchronizing components, said last named means being adapted to generate a first control signal representative of the magnitude of the phase difference between each of said line synchronizing components, a source of a predetermined cyclical second control signal, and means to vary the speed of movement of said storage medium in response to said second control signal in the absence of coincidence between said field synchronizing components and otherwise in response to said first control signal.

4. In a television system having a composite television signal recorded on a movable storage medium and a local source of standard synchronizing signals, said signals being of the interlaced variety including alternate even and odd interlaced field scansion representations, the even field scansion signal representations being identified by a first configuration of related synchronizing signals embraced by an adjacent field blanking interval while the odd field scansion representations are identified by a second and different configuration of related synchronizing signals embraced by the next consecutive field blanking interval, each of the synchronizing signal configurations including a line component and a field component, the combination of means for recovering said television signal from said storage medium, means for separating the line and field synchronizing components from the recovered television signal and from one another, means coupled to said standard source and to said separating means for comparing the phase of said separated even field synchronizing components with the phase of said standard even field synchronizing components, line phase comparing means coupled to said standard source and to said separating means for comparing the phase of said separated line synchronizing components with the phase of said standard line synchronizing components, a source of a predetermined cyclical control signal, and means for varying the speed of said storage medium in response to said control signal in the absence of substantial coincidence between said even field synchronizing components and otherwise in response to the phase difference between said line synchronizing components as determined by said line phase comparing means.

5. In a television system having a television signal recorded on a movable storage medium and a local television signal source, each of said television signals including a picture representative component, and line and field synchronizing components, the combination of means for recovering said television signal from said storage medium, means for separating the line and field synchronizing components from the recovered television signal and from one another, means for separating the line and field synchronizing components from the local television signal and from one another, a first signal comparator circuit, means for simultaneously applying said recovered separated field synchronizing components and said local separated field synchronizing components to said first comparator circuit, said first signal comparator circuit being adapted to develop a first output control signal in accordance with the timing relation between said separated field synchroninzing components, a second signal comparator circuit, means for simultaneously applying said recovered separated line synchronizing components and said local separated line synchronizing components to said second comparator circuit, said second comparator circuit being adapted to develop a second output control signal in accordance with the timing relation between said separated line synchronizing components, a source of a predetermined speed control signal, means for controlling the speed of said storage medium in accordance with said predetermined speed control signal until said first control signal indicates coincidence between said separated field synchronizing components and then for controlling the speed of said storage medium in accordance with said second output control signal.

6. In a television system having a television signal recorded on a movable storage medium and a local television signal source, each of said television signals including a picture representative component, and line and field synchronizing components, the combination of means for recovering said televesion signal from said storage medium, means for separating the line and field synchronizing components from the recovered television signal and from each other, means for separating the line and field synchronizing components from the local television signal and from each other, a first signal phase comparator circuit, means for simultaneously applying said recovered separated field synchronizing components and said local separated field synchronizing components to said first comparator circuit, said first signal comparator circuit being adapted to develop a first output control signal in accordance with the timing relation between said separated field synchronizing components, a second signal phase comparator circuit, means for simultaneously applying said recovered separated line synchronizing components and said local separated line synchronizing components to said second comparator circuit, said second comparator circuit being adapted to develop a second output control signal in accordance with the timing relation between said separated line synchronizing components, a source of a predetermined speed control signal, and means responsive to said first output control signal to selectively control the speed of said storage medium by said predetermined speed control signal and by said second control signal.

7. In a television system having a television signal recorded on a movable storage medium and a local television signal source, each of said television signals including a picture representative component, and line and field synchronizing components, the combination of means for recovering said television signal from said storage medium, means for separating the line and field synchronizing components from the recovered television signal and from each other, means for separating the line and field synchronizing components from the local television signal and from each other, a first signal comparator circuit, means for simultaneously applying said recovered separated field synchronizing components and said local separated field synchronizing components to said first comparator circuit, said first signal comparator circuit being adapted to develop a first output control signal in accordance with the timing relation between said separated field synchronizing components, a second signal comparator circuit, means for simultaneously applying said recovered separated line synchronizing components and said local separated line synchronizing components to said second comparator circuit, said second comparator circuit being adapted to develop a second output control signal in accordance with the timing relation between said separated line synchronizing components, a source of a cyclical control signal for successively increasing and decreasing the speed of movement of said storage medium, means for controlling the speed of said storage medium in accordance with said cyclical control signal until said first control signal indicates coincidence between said separated field synchronizing pulses and then for controlling the speed of said storage medium in accordance with said second output control signal whereby a predetermined timing relation between said recovered and said local television signals is maintained automatically.

References Cited in the file of this patent

UNITED STATES PATENTS

| | | |
|---|---|---|
| 2,727,097 | Frayne | Dec. 13, 1955 |
| 2,774,927 | Evans | Dec. 18, 1956 |
| 2,854,526 | Morgan | Sept. 30, 1958 |